United States Patent
Eijkelenberg et al.

(10) Patent No.: US 9,512,927 B2
(45) Date of Patent: Dec. 6, 2016

(54) PNEUMATIC GATE VALVE WITH INTEGRATED PRESSURIZED GAS RESERVOIR

(75) Inventors: Tom Eijkelenberg, Westerlo (BE); Guy Jakus, Zemst (BE)

(73) Assignee: FIKE CORPORATION, Blue Springs, MO (US)

( * ) Notice: Subject to any disclaimer, the term of this patent is extended or adjusted under 35 U.S.C. 154(b) by 712 days.

(21) Appl. No.: 13/408,522

(22) Filed: Feb. 29, 2012

(65) Prior Publication Data

US 2013/0221252 A1   Aug. 29, 2013

(51) Int. Cl.
*F16K 3/02* (2006.01)
*F16K 31/40* (2006.01)

(52) U.S. Cl.
CPC ........... *F16K 3/0254* (2013.01); *F16K 31/402* (2013.01)

(58) Field of Classification Search
CPC .. F16K 3/0254; F16K 31/402; F15B 2215/00; F15B 2215/30; F15B 2215/305
USPC ..... 251/30.01, 30.02, 30.05, 62; 60/403–406
See application file for complete search history.

(56) References Cited

U.S. PATENT DOCUMENTS

| | | | |
|---|---|---|---|
| 3,046,802 A * | 7/1962 | Janse | 74/110 |
| 3,244,399 A * | 4/1966 | Jones et al. | 251/327 |
| 4,007,906 A | 2/1977 | Karpenko | |
| 4,029,289 A | 6/1977 | Miffre | |
| 4,051,676 A | 10/1977 | Ledeen et al. | |
| 4,065,094 A | 12/1977 | Adams | |
| 4,103,863 A | 8/1978 | Houlgrave et al. | |
| 4,187,876 A | 2/1980 | Lang | |
| 4,213,480 A | 7/1980 | Orum et al. | |
| 4,215,749 A | 8/1980 | Dare et al. | |
| 4,258,786 A | 3/1981 | Lochte et al. | |
| 4,290,578 A | 9/1981 | Earp et al. | |
| 4,405,014 A | 9/1983 | Talafuse | |
| 4,809,733 A | 3/1989 | Hawkins | |
| 4,979,528 A | 12/1990 | Asbra et al. | |
| 5,056,544 A | 10/1991 | Stevens | |
| 5,362,028 A | 11/1994 | Jacobs | |
| 6,010,112 A * | 1/2000 | Sidler | 251/62 |

(Continued)

FOREIGN PATENT DOCUMENTS

| | | |
|---|---|---|
| GB | 2046880 | 11/1980 |
| JP | 2008277950 | 10/1996 |
| JP | 2005155737 | 6/2005 |

OTHER PUBLICATIONS

The International Search Report and Written Opinion dated Jun. 7, 2013, in the corresponding PCT/US2013/028237 application filed on Feb. 28, 2013.

(Continued)

*Primary Examiner* — Craig Schneider
*Assistant Examiner* — Frederick D Soski
(74) *Attorney, Agent, or Firm* — Hovey Williams LLP

(57) ABSTRACT

A rapid-closure gate valve (10) comprising pressurized gas reservoirs (37, 39) that are integrated with the valve body (12). Pressurized gas stored in the reservoirs (37, 39) is utilized to shift a gate member (20) from a valve open position to a valve closed position upon actuation of the valve. Actuation of the valve is achieved by an actuator assembly (14) coupled with the valve body. The actuator assembly is configured to initiate a flow of pressurized gas from the reservoirs into a chamber (48) which effects shifting of the gate member.

14 Claims, 13 Drawing Sheets

(56) References Cited

U.S. PATENT DOCUMENTS

| | | | |
|---|---|---|---|
| 6,085,777 A * | 7/2000 | Welker | 137/317 |
| 6,131,594 A | 10/2000 | Staggs et al. | |
| 6,419,022 B1 | 7/2002 | Jernigan et al. | |
| 6,540,029 B2 | 4/2003 | Snoeys et al. | |
| 7,014,164 B2 * | 3/2006 | Sidler | 251/62 |
| 7,231,934 B2 * | 6/2007 | Biester | 137/68.13 |
| 7,356,990 B2 | 4/2008 | Burdick et al. | |
| 7,871,061 B1 | 1/2011 | Mandeville, Jr. et al. | |
| 2002/0124889 A1 | 9/2002 | Sundararajan | |
| 2003/0116733 A1 * | 6/2003 | Hoang et al. | 251/62 |
| 2003/0141471 A1 * | 7/2003 | Abbott | 251/30.02 |
| 2010/0025044 A1 | 2/2010 | McKay et al. | |
| 2010/0126161 A1 | 5/2010 | Rose | |
| 2011/0155250 A1 * | 6/2011 | Nannan et al. | 137/1 |

OTHER PUBLICATIONS

Patent Examination Report No. 1 issued on Aug. 25, 2016 in Australian application No. 2013225962.

\* cited by examiner

PNEUMATIC GATE VALVE WITH INTEGRATED PRESSURIZED GAS RESERVOIR

BACKGROUND OF THE INVENTION

Field of the Invention

The present invention is generally directed toward a rapid-closure gate-type isolation valve. The gate valve comprises one or more integrated reservoirs for holding a pressurized gas that effects operation of the valve. The isolation valve further includes an actuator assembly responsible for initiating operation of the valve. In particular embodiments, the isolation valve operates without employing a pyrotechnic device.

Description of the Prior Art

Isolation valves, including gate-type valves, have been used to prevent propagation of hazardous conditions, such as fires and explosions, within various types of process equipment. As many hazardous conditions tend to propagate very quickly, rapid closure of valves is important to the successful isolation of vulnerable process equipment. A number of valve designs have been proposed which effect rapid closing and corresponding isolation of process apparatus.

U.S. Pat. No. 6,131,594 to Staggs et al. is directed toward an isolation gate valve. A valve actuator is provided which includes a gas-generating cartridge unit which, upon actuation, generates a charge of high pressure subsonic gas for shifting the gate member at a velocity of about 0.2 to about 0.33 in/msec. Essentially, the gas-generating cartridge contains a solid propellant that is combusted upon actuation of the valve. The gas generated by combustion of the solid propellant acts upon a piston to effect valve closure.

U.S. Pat. No. 5,362,028 to Jacobs is directed to a high-speed gate valve that is actuated by an explosive squib. Upon detection of a system abnormality, the squib explodes, which permits discharge of pressured gas from a bottle into a cylinder. Increased pressure within the cylinder forces the piston and its rod outwardly thereby moving the gate plate into a closed position.

The pyrotechnics used in these types of valves are heavily regulated, and thus the transport of such valves from the manufacturer to the customer can be very difficult, if such is even permitted by a particular jurisdiction.

U.S. Pat. No. 4,051,676 to Ledeen et al. is directed to an emergency hydraulic ram valve actuator and includes a cylinder having a piston that may be connected to a gate valve. Upon actuation of a poppet valve pressurized fluid is supplied from a pair of accumulators into a cylinder moving a piston which closes the valve. The Leeden et al. actuator comprises a number of redundancies so that the valve may still operate even though it may be damaged or partially disabled. Such systems greatly increase the complexity and bulk of the valve, which may render it unsuitable for installation in tight confines, which are often encountered in certain plants.

SUMMARY OF THE INVENTION

The present invention overcomes a number of the shortcomings of prior valves, and in one embodiment provides a valve comprising a valve body, a gate member received within the valve body, and an actuator assembly. The valve body includes at least one pressurized gas reservoir that is at least partially defined by the valve body. The gate member is shiftable within the valve body between a valve open position and a valve closed position. The actuator assembly is configured to initiate a flow of pressurized gas stored in the reservoir and cause the gate member to shift from the valve open position to the valve closed position.

According to another embodiment of the present invention there is provided a valve comprising a valve body in which a gate member is slidably received, piston structure that is secured to the gate member, a pressurized gas reservoir, and an actuator assembly. The piston structure is received in a chamber formed in the valve body and is configured to effect shifting of the gate member between a valve open and a valve closed position. The pressurized gas reservoir is fluidly connected with the chamber by a pathway. The actuator assembly is configured to initiate a flow of pressurized gas stored in the reservoir into the chamber to shift the gate member from the valve open position to the valve closed position. The actuator assembly includes a seal normally maintained in blocking relationship to the pathway at least in part by a force exerted on the seal by the pressurized gas stored within the pressurized gas reservoir. The seal is shiftable out of blocking relationship to the pathway upon actuation of the actuator assembly thereby permitting communication between the pressurized gas reservoir and the chamber.

DETAILED DESCRIPTION OF THE PREFERRED EMBODIMENT

Figure 1:
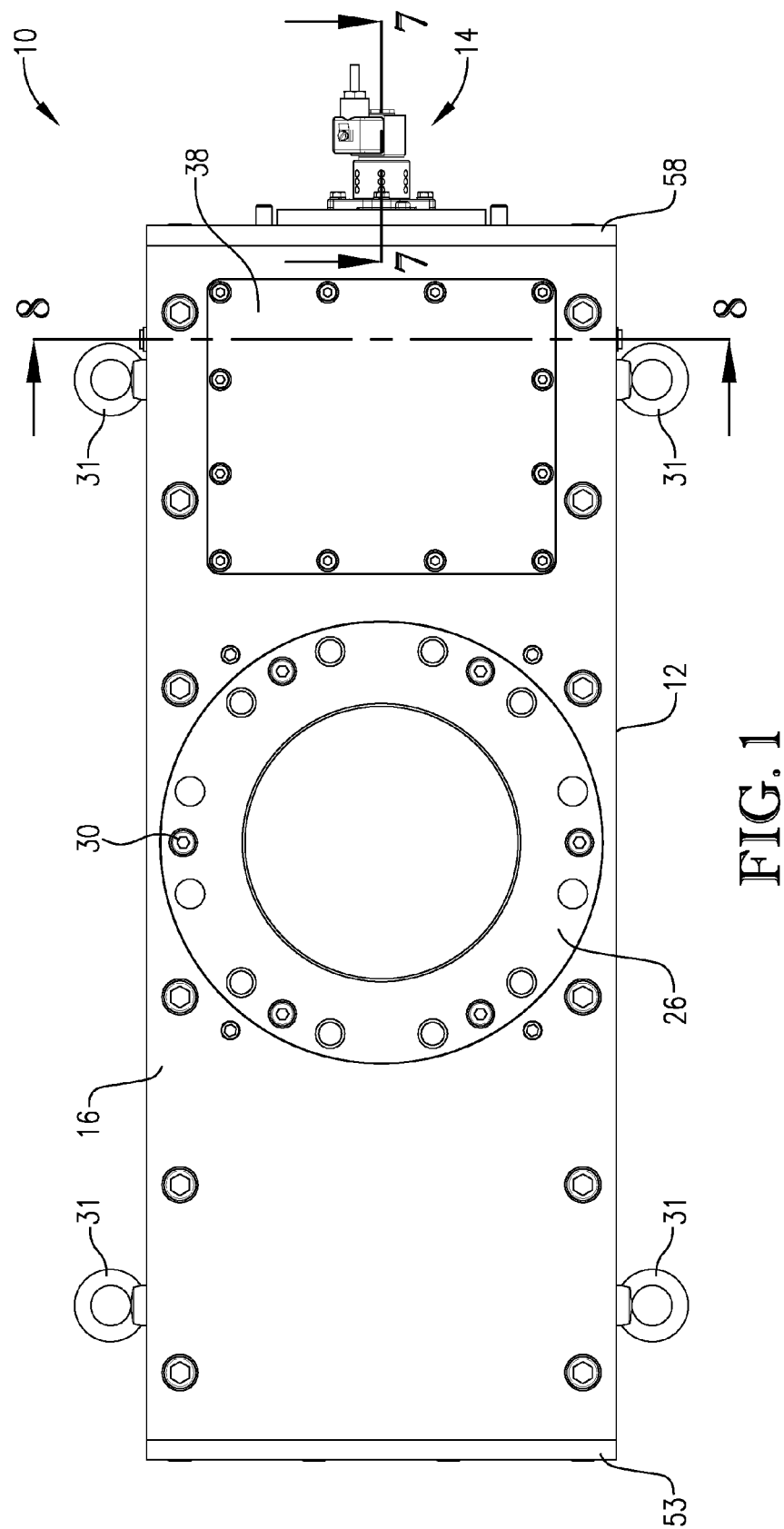
FIG. 1 is a side elevation view of a valve in accordance with one embodiment of the present invention.
Figure 2:
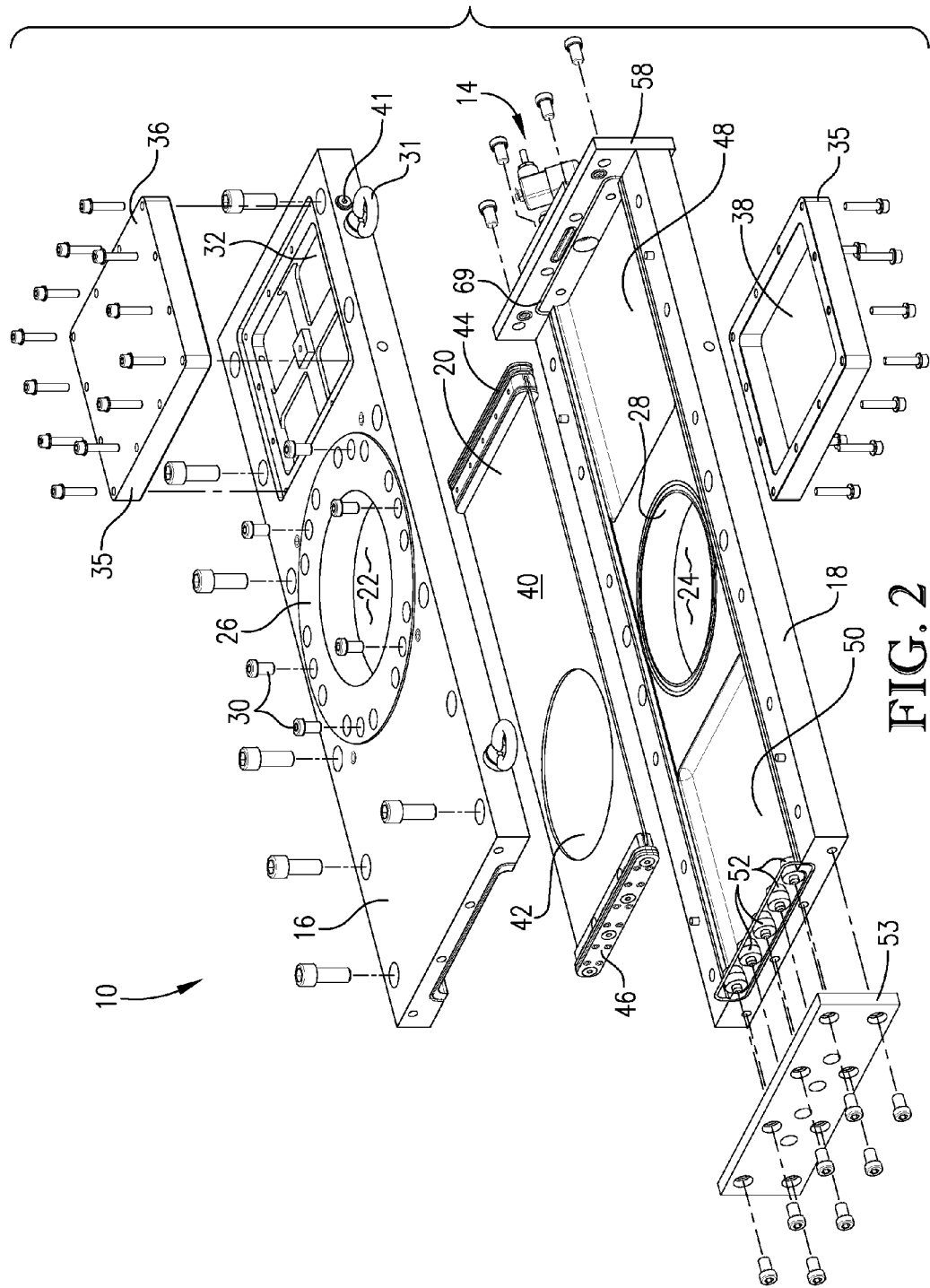
FIG. 2 is an expanded view of the valve of FIG. 1, and particularly, and expanded view of the valve body.
Figure 8:
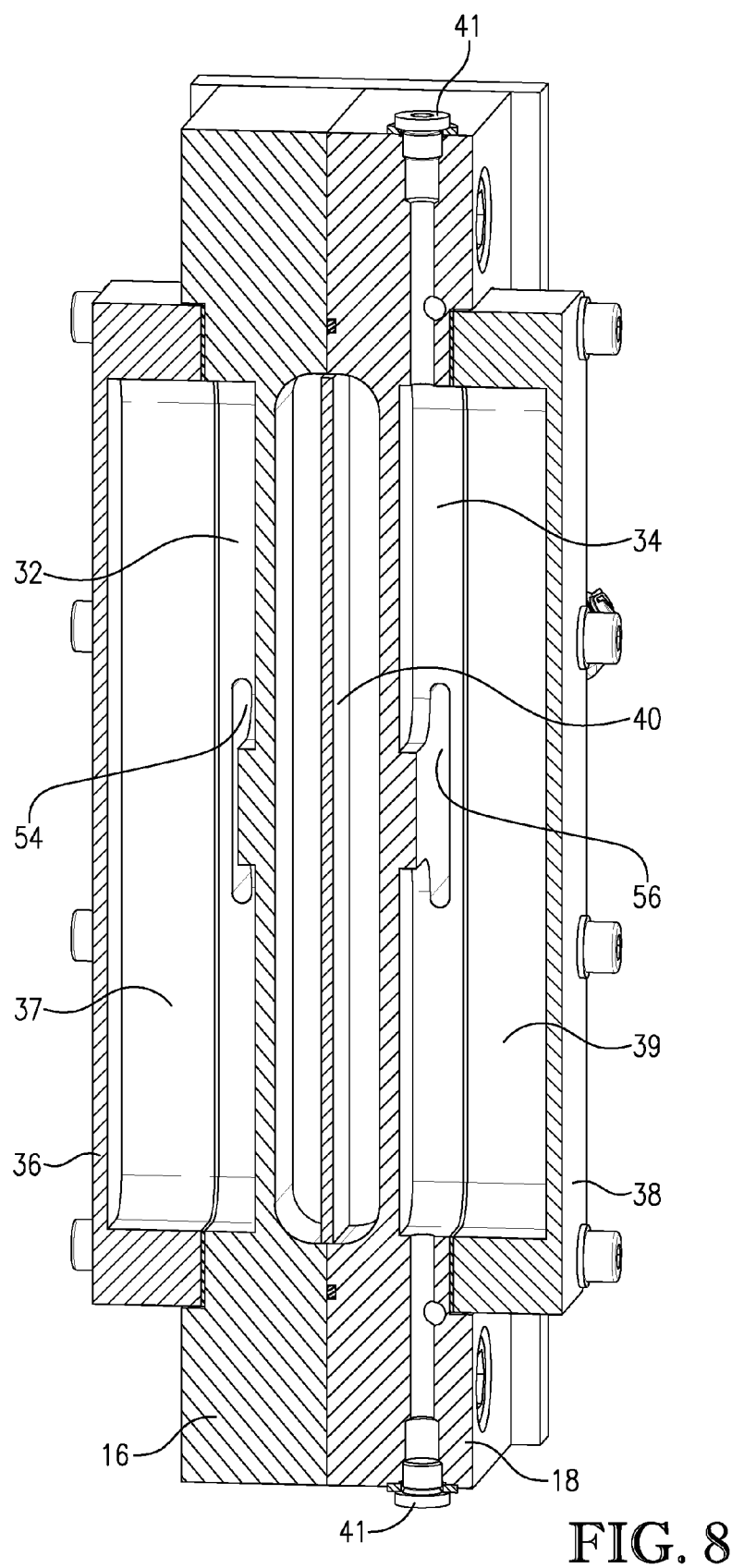
FIG. 8 is a cross-sectional view of the valve taken along line 8-8 of FIG. 1.
Figure 9:
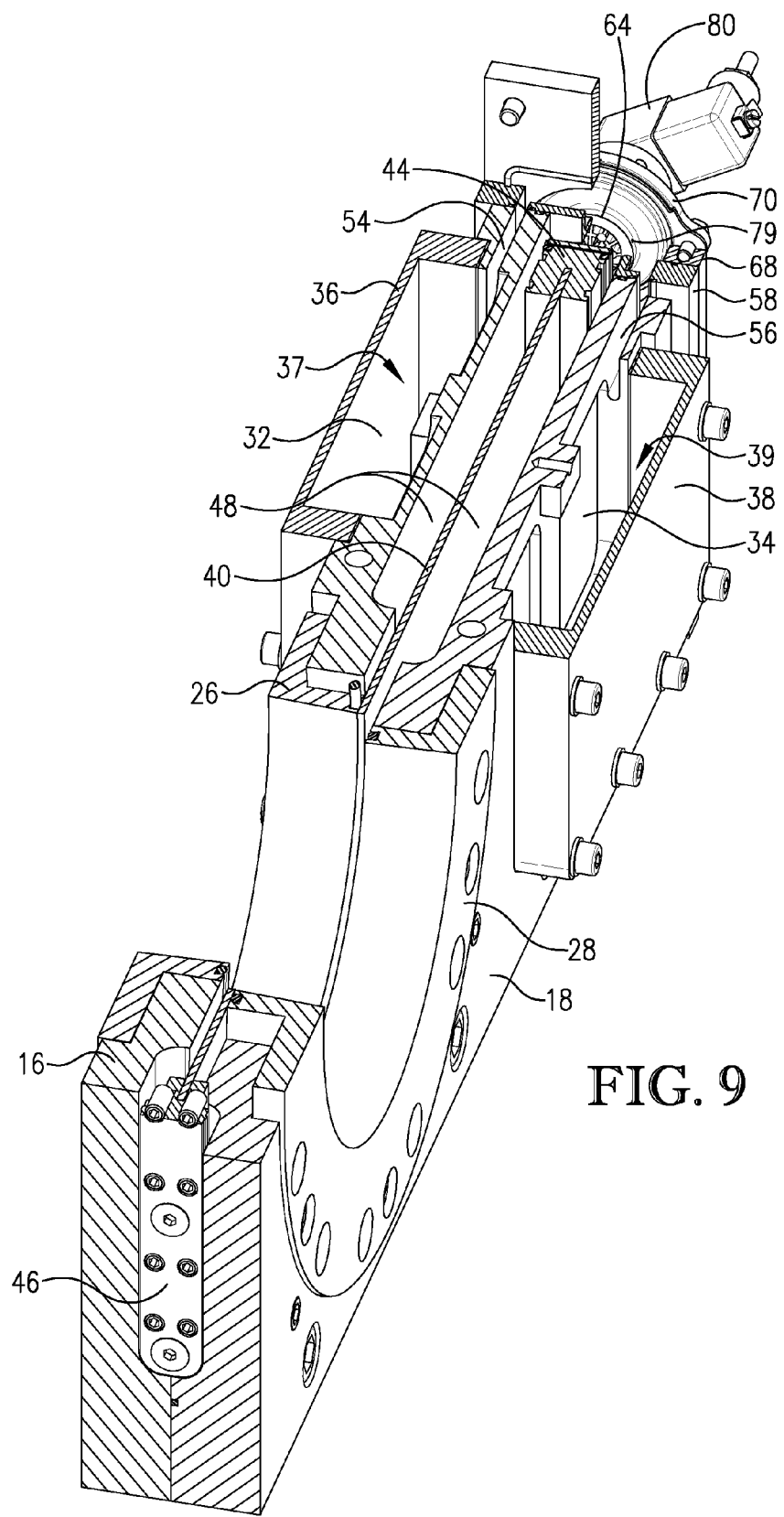
FIG. 9 is a longitudinal cross-sectional view of the valve of FIG. 1.

Turning to FIG. 1, an isolation valve 10 made in accordance with one embodiment of the present invention is depicted. Valve 10 comprises a valve body 12 and an actuator assembly 14 secured thereto. As shown in FIG. 2, valve body 12 generally comprises a pair of opposed sidewall sections 16, 18 and a shiftable gate member 20 received therebetween. Each of sidewall sections 16, 18 include an orifice 22, 24 formed therein and in general registry with each other. Sidewall sections 16, 18 further include flanges 26, 28 secured thereto by bolts 30 that are configured to be coupled with conventional pipe connectors (not shown). At least one of sidewall sections 16, 18 may be provided with a plurality of eye bolts 31 to assist with transport and mounting of valve 10. Sidewall sections 16, 18 each comprise recessed areas 32, 34 (see, FIGS. 8 and 9) that cooperate with covering plates 36, 38 to define pressurized gas reservoirs 37, 39, whose function is explained in greater detail below. Covering plates 36, 38 are each shown as having a circumscribing skirt 35. The width of skirt 35 may be adjusted in order to enlarge or reduce the capacity of reservoirs 37, 39 as needed. As shown in FIG. 8, at least one of sidewall sections 16, 18 may be provided with one or more side ports 41 that communicates with reservoirs 37, 39 and can be connected with a source of pressurized gas (not shown) for filling of the reservoirs or monitoring instrumentation (e.g., a pressure gauge).

Figure 10:
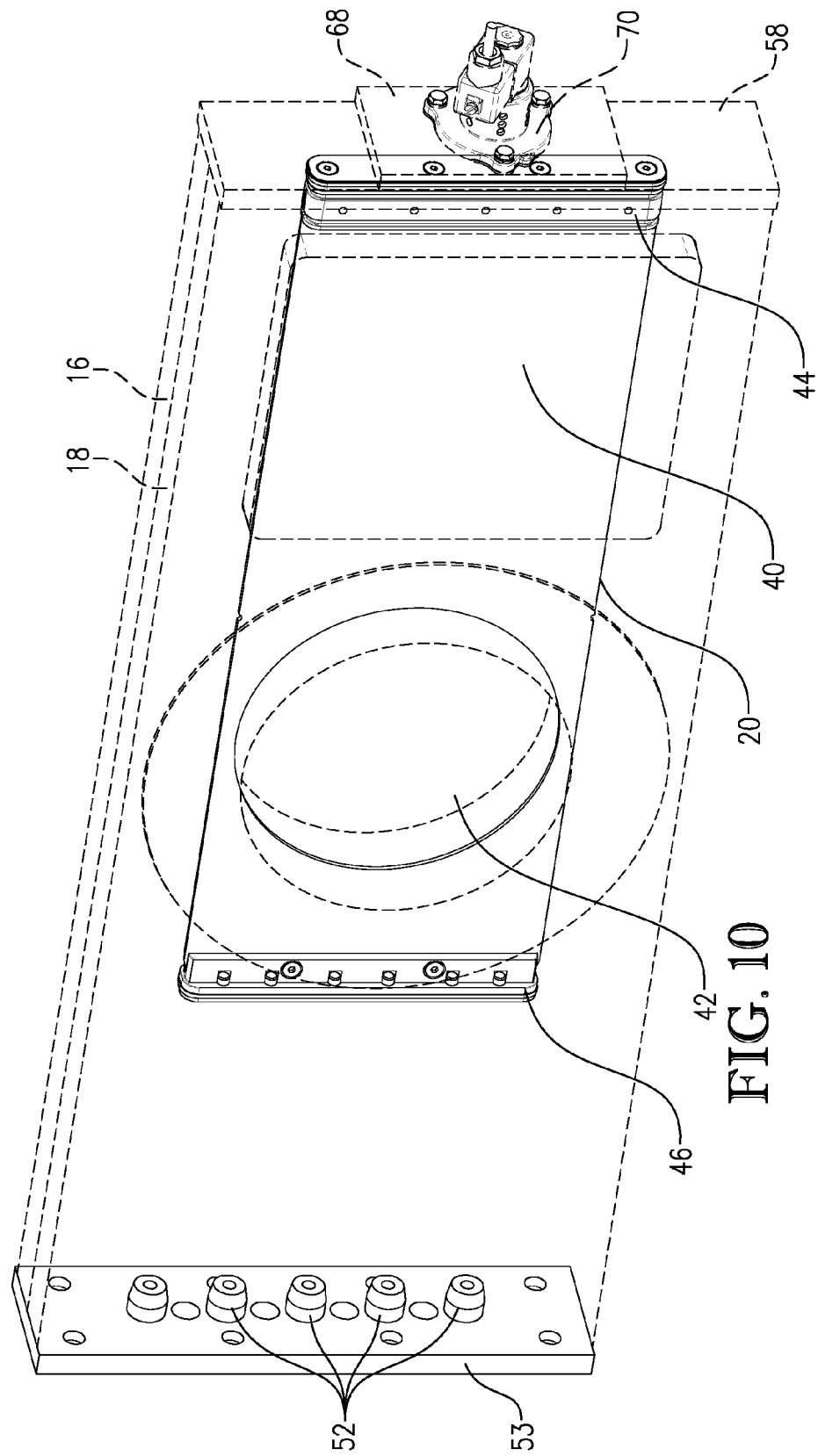
FIG. 10 is a perspective view of the valve of FIG. 1 with portions of the valve body depicted in phantom thereby illustrating the gate member in the valve open position.
Figure 11:
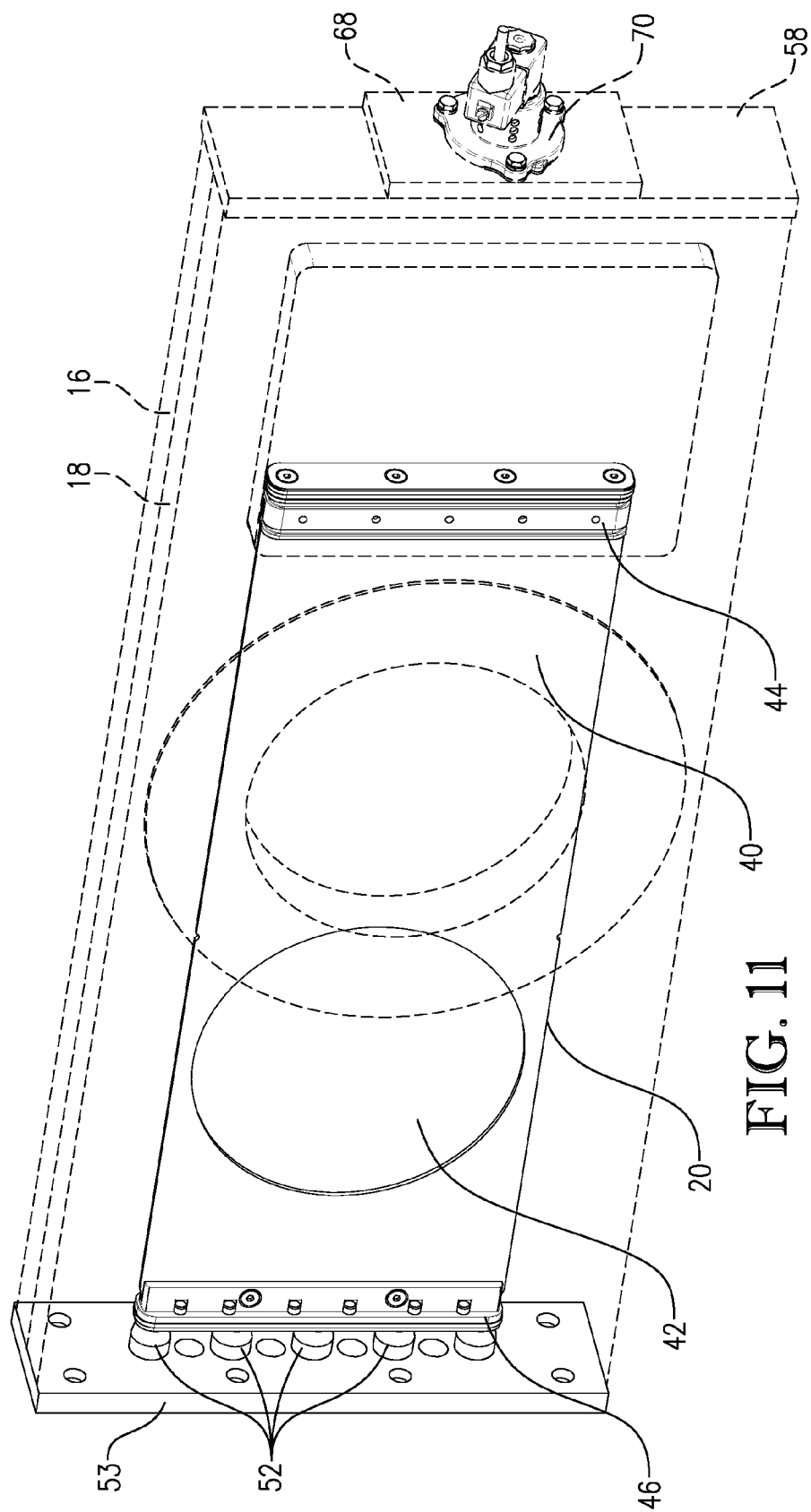
FIG. 11 is a perspective view of the valve of FIG. 1 with portions of the valve body depicted in phantom thereby illustrating the gate member in the valve closed position.

Gate member 20 comprises a planar plate section 40 having a laterally offset orifice 42 formed therein. The ends of gate member 20 are fitted with a piston body 44 and a damper body 46, respectively. As shown in FIG. 2, piston body 44 is of oblong configuration and slidably received in a chamber 48 formed by sidewall sections 16, 18 to effect shifting of gate member 20 between a valve open position where orifice 42 is in registry with orifices 22, 24 (see, FIG. 10), and a valve closed position where communication between orifices 22, 24 is blocked by plate section 40 (see, FIG. 11). However, it is within the scope of the present invention for piston body 44 to be of alternate configurations, such as cylindrical, and operably coupled with plate section 40 through connecting means such as a rod. Damper body 46 is also of oblong configuration and is received in a chamber 50 formed between sidewall sections 16, 18 and disposed in valve body 12 on the opposite side of orifices 22, 24 from chamber 48. Damper body 46 is configured to contact one or more resilient members 52 secured to a base plate 53 which interconnects sidewall sections 16, 18. Resilient members 52 cushion the rapid deceleration of gate member 20 when it is shifted to the closed position.

Figure 3:
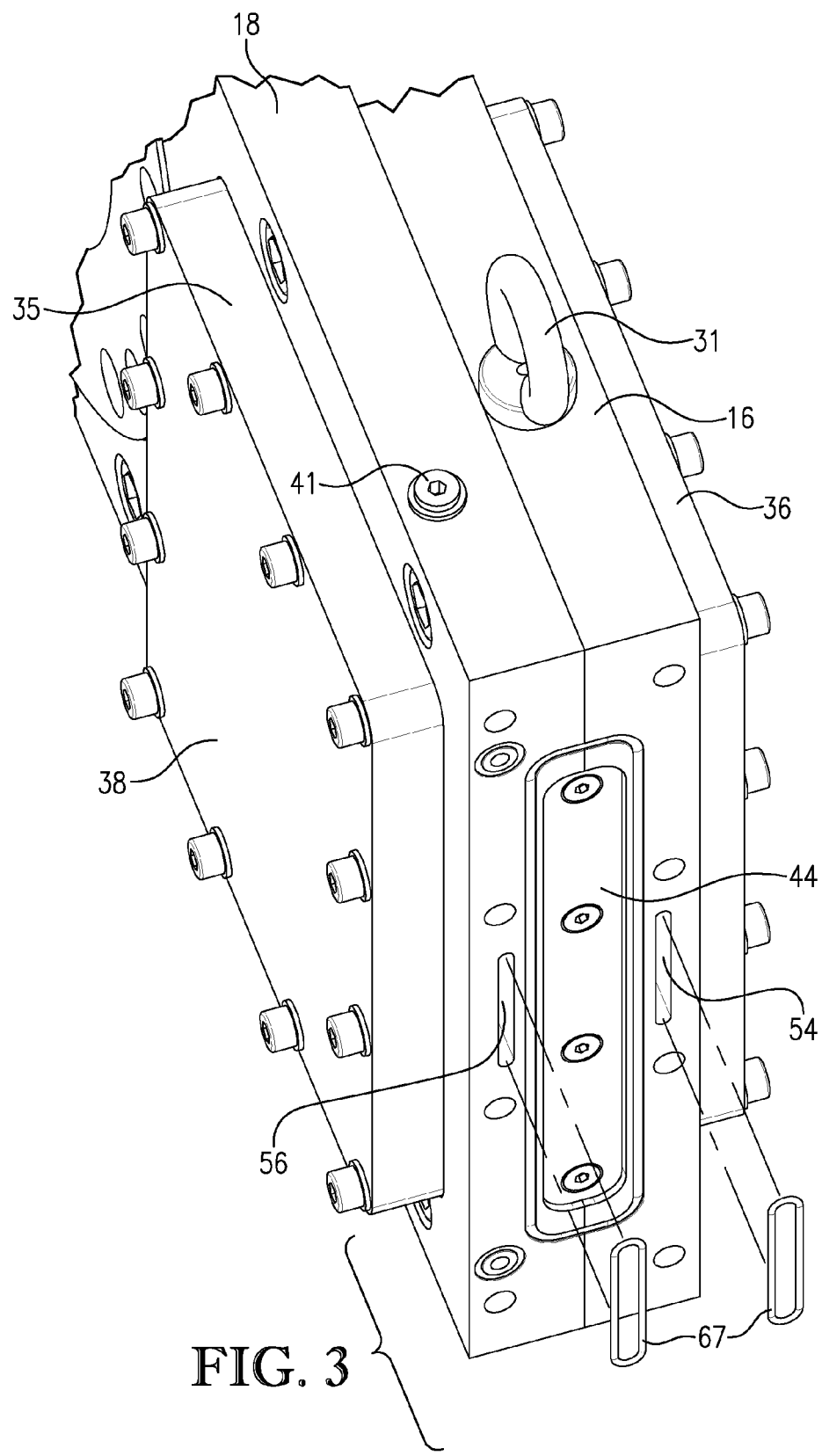
FIG. 3 is a perspective view of a portion of the valve of FIG. 1 with the actuator assembly removed and illustrating the passage between the pressurized gas reservoirs and the internal chamber in which the piston structure of the gate member is slidably received.

Shifting of gate member 20 from the valve open position to the valve closed position is effected by the transfer of pressurized gas stored in reservoirs 37, 39 to chamber 48. The pressurized gas acts upon piston body 44 so as to cause gate member 20 to shift. The transfer of pressurized gas from reservoirs 37, 39 into chamber 48 is controlled by actuator assembly 14. Passages 54, 56, see, e.g. FIG. 3, formed in respective sidewall sections 16, 18 communicate reservoirs 37, 39 with actuator assembly 14. The pressurized gas utilized to operate valve 10 may be any pressurized gas, such as air, nitrogen, or other inert gas. Pressurized gas may be initially supplied to reservoirs 37, 39 through one or more of ports 41. Once charged, the source of pressurized gas may be disconnected so that, with the exception of actuator assembly 14, valve 10 is essentially a stand alone device and does not rely upon an external source of pressurized gas for operation. Furthermore, valve 10 operates free of pyrotechnics or gas produced through operation of pyrotechnics.

Figure 4:
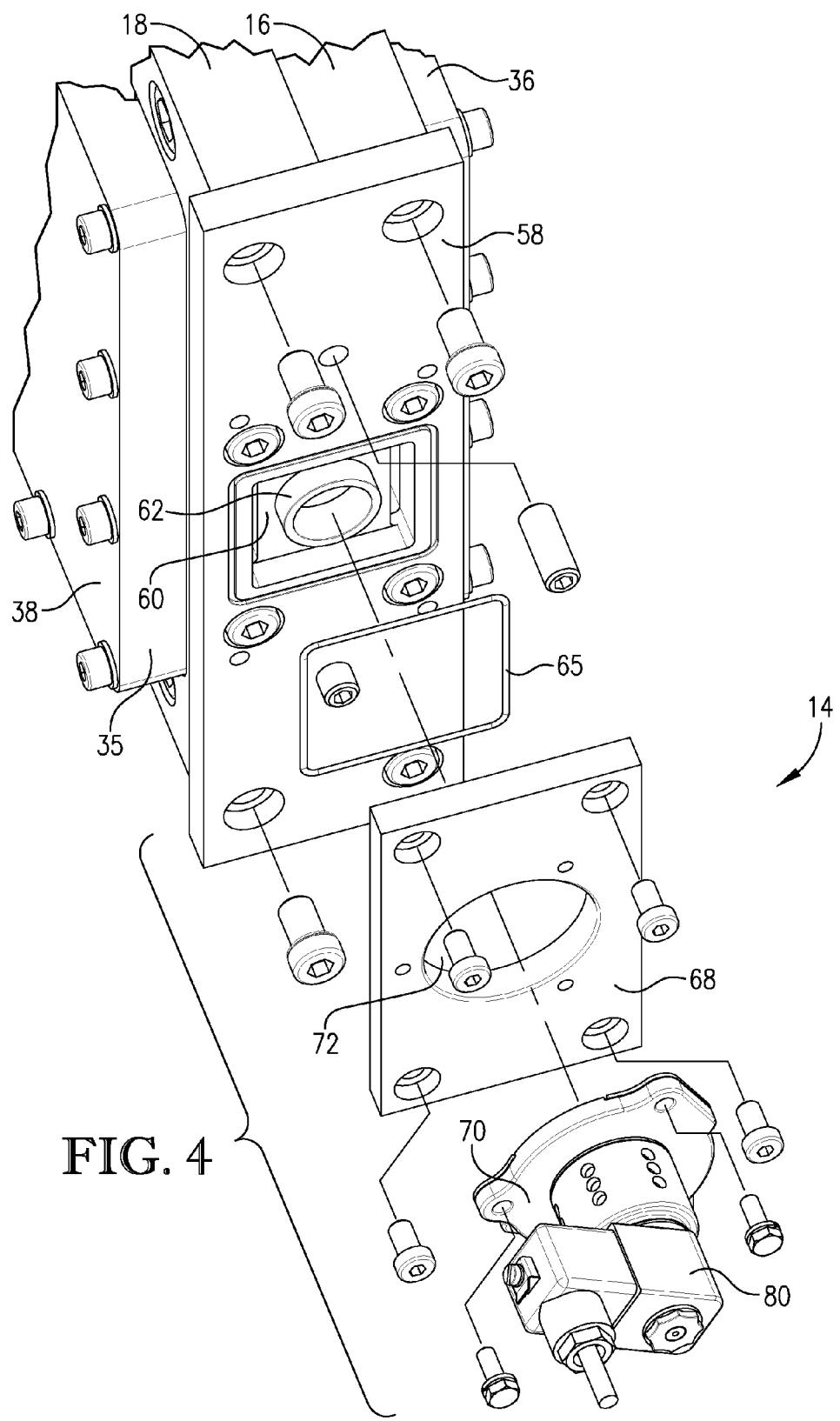
FIG. 4 is an expanded view of the mounting structure for the actuator assembly.
Figure 7A:
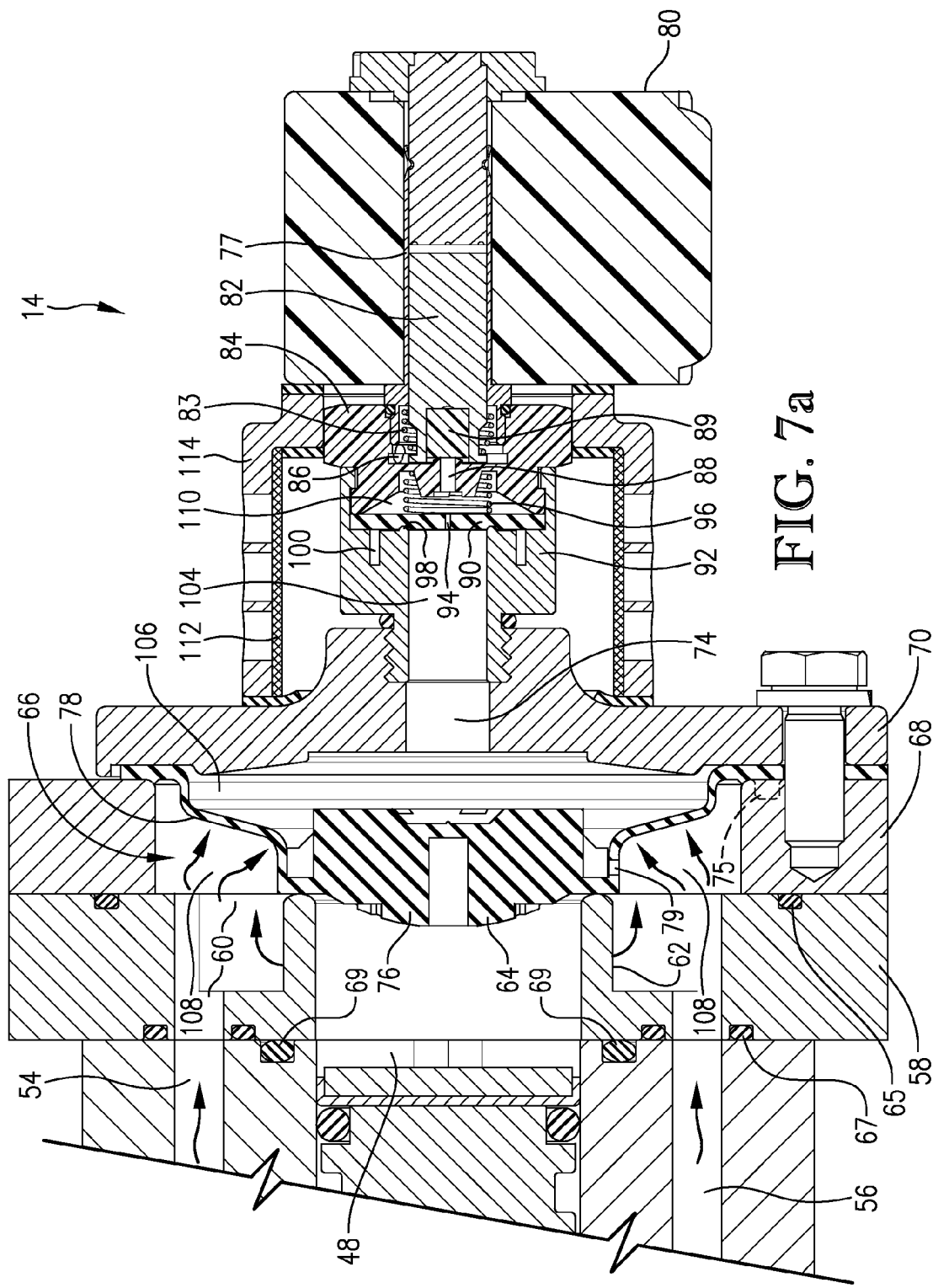
FIG. 7a is a cross-sectional view of the valve body and actuator assembly in the valve open configuration.

As shown in FIGS. 4 and 7a, for example, actuator assembly 14 is secured to valve body 12 by a mounting plate 58. Mounting plate 58 comprises a central section 60 including a cylindrical projection 62 which functions as a seat for seal 64. Seal 64 is secured within an enclosed area 66 defined at least in part by a spacer plate 68 and a connector plate 70. Spacer plate 68 comprises a central bore 72, and connector plate 70 also comprises a central opening 74 that communicates with bore 72. Actuator assembly 14 is also provided with a number of o-rings 65, 67, 69 and washers 81, 85, 87 as needed to seal between the various components.

Figure 5:
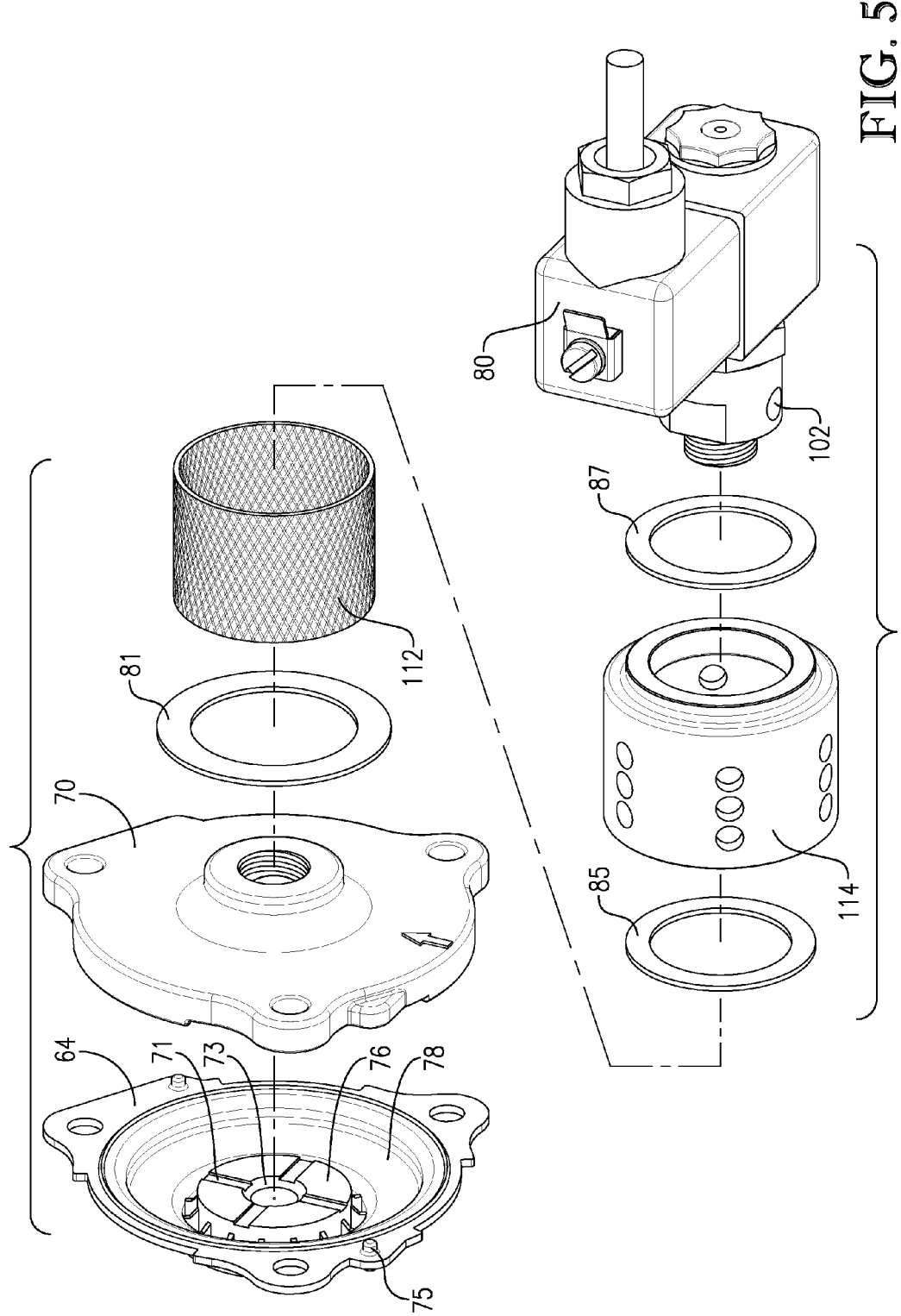
FIG. 5 is an expanded view of an actuator assembly that may be used with a valve according to the present invention.
Figure 6:
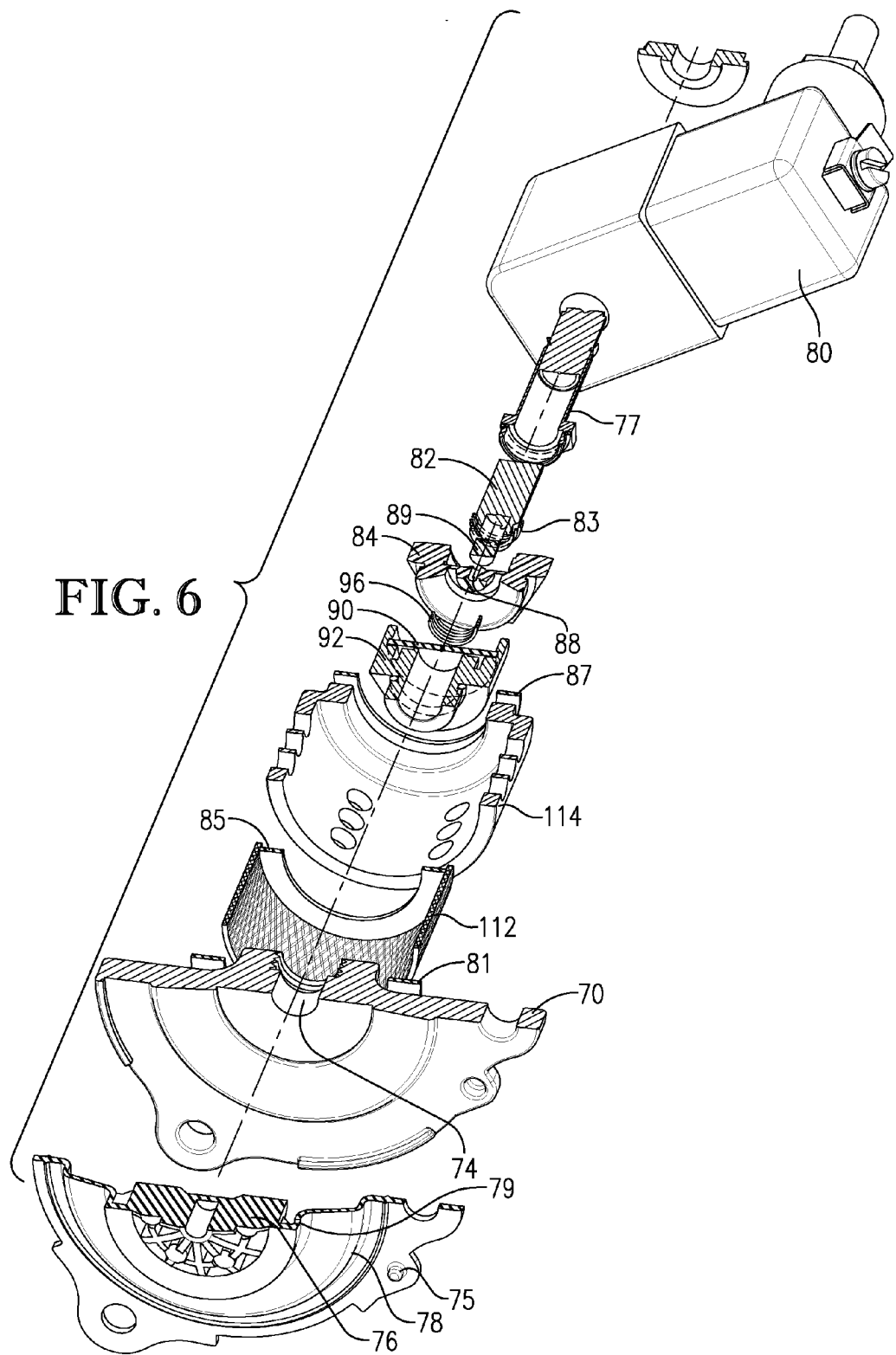
FIG. 6 is an expanded, cross-sectional view of the actuator assembly of FIG. 5.

As shown in FIGS. 5 and 6, seal 64 comprises a thicker central section 76 and a thinner outer section 78 that is secured between spacer plate 68 and connector plate 70. The portion of central section 76 that is disposed in facing relationship to connector plate 70 is configured with a plurality of channels 71 that converge upon central recess 73. Outer section 78 includes one or more tabs 75 that assist with proper alignment of seal 64 when assembling actuator assembly 14. At least one through opening 79 is formed in outer section 78 that permits communication of pressurized gas stored in reservoirs 37, 39 with the portion of seal 64 in facing relationship to connector plate 70 (i.e., not in direct facing relationship with the yet-to-be-described pathway fluidly interconnecting reservoirs 37, 39 with chamber 48). As explained below, the transmission of pressurized gas through opening 79 permits the pressurized gas in reservoirs 37, 39 to maintain seal 64 seated against projection 64 and in blocking relationship to chamber 48.

When reservoirs 37, 39 are charged with pressurized gas, the pressurized gas exerts a force on the portion of seal outer section 78 that is in facing relationship to central section 60 of mounting plate 58 (i.e., in direct facing relationship with the yet-to-be-described pathway interconnecting reservoirs 37, 39 with chamber 48). This force is less than the force acting upon the portion of seal outer section 78 that is in facing relationship to connector plate 70 thereby keeping seal 64 seated against tubular projection 62 and in blocking relationship to the flow of pressurized gas from reservoirs 37, 39 into chamber 48.

In one embodiment of the present invention, actuator assembly 14 comprises a solenoid actuator 80. In its normal, non-actuated configuration, a shiftable plug 82, received within a sleeve 77 is biased by a spring 83 toward a seat 84 coupled with actuator 80. Seat 84 includes a passage 86 formed therein that communicates the internal bore 88 of seat 84 with the exterior thereof. In the non-actuated configuration, plug 82, which includes an insert 89 made of a resilient material, blocks passage 86 so that pressurized gas within the actuator assembly cannot escape. Particularly, insert 89 seals off internal bore 88, so as to prevent communication thereof with passage 86. A flexible membrane 90 is installed between seat 84 and a coupler 92. Membrane 90 includes a central pinhole orifice 94 that permits communication of pressurized gas with bore 88. A spring 96 is disposed between seat 84 and membrane 90 and is configured to bias membrane 90 to a seated position against a circular rib 98 formed in coupler 92. Thus, in the non-actuated configuration, membrane 90 seals off an annular recess 100 formed in coupler 92. Recess 100 communicates with the exterior of coupler 92 by a side port 102 (see, FIG. 5). Coupler 92 also contains a central bore 104 that is in registry with opening 74 formed in connector plate 70.

As previously noted, the pressurized gas stored in reservoirs 37, 39 assists in maintaining seal 64 in a blocking relationship with chamber 48, and thus the valve 10 in an open position until closing of the valve is desired and initiated by actuator assembly 14. Particularly, reservoirs 37, 39 communicate with enclosed area 66 via passages 54, 56. The portion of enclosed area 66 defined in part by the surface of seal outer section 78 that faces passages 54, 56 communicates with the portion of enclosed area 66 defined in part by the surface of seal outer section 78 that faces connector plate 70 via through opening 79. Therefore, seal 64 essentially divides enclosed area 66 into an upper portion 106 and a lower portion 108. Given this configuration, the surface area of seal 64 that is in direct facing relationship to connector plate 70 is greater than the surface area of seal 64 that is in direct facing relationship with spacer plate 68 and mounting plate 58, when seal 64 is seated on tubular projection 62. Accordingly, the pressurized gas contained within reservoirs 37, 39 exerts a greater closing force than opening force on seal 64.

Figure 7B:
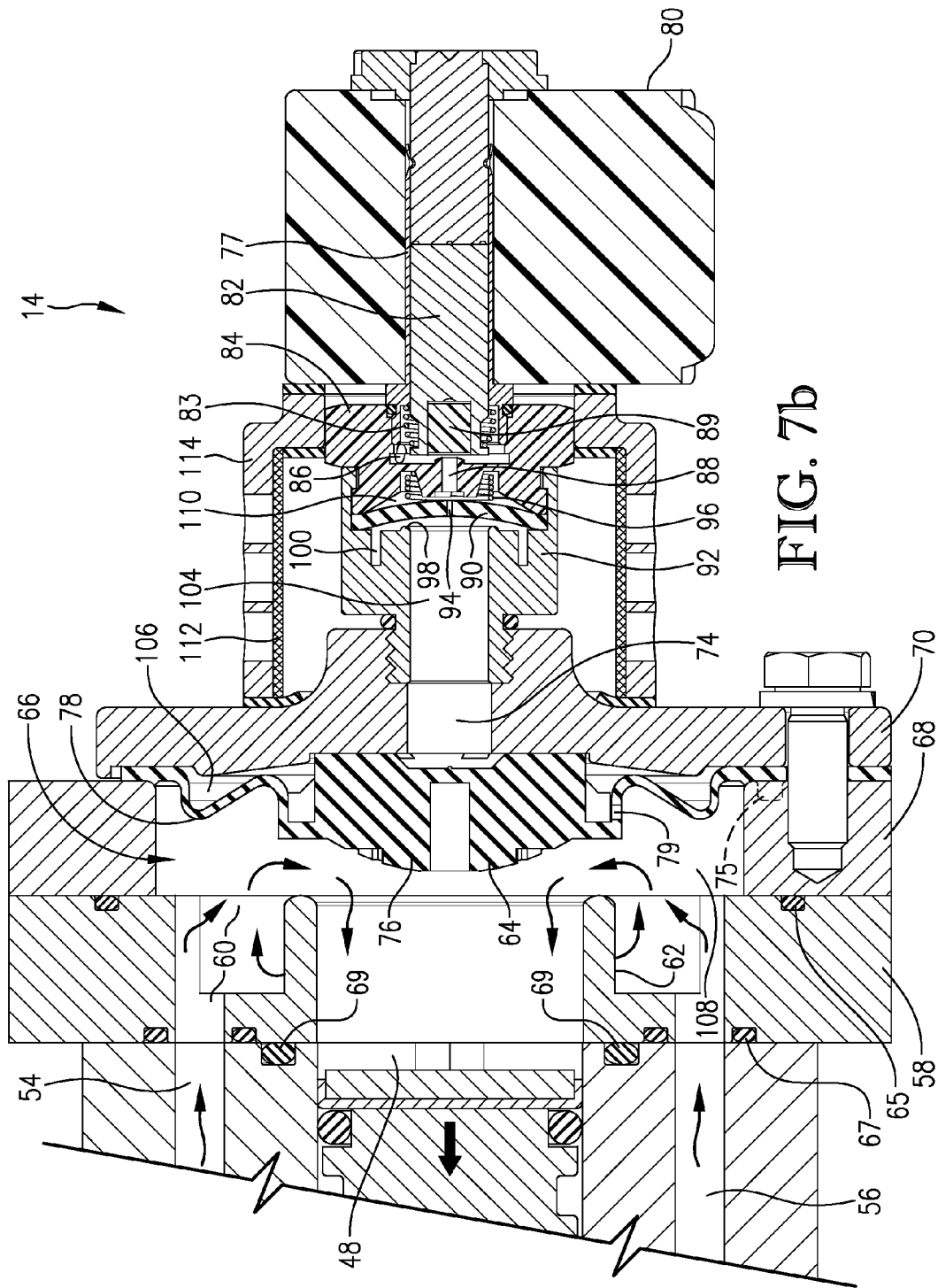
FIG. 7b is a cross-sectional view of the valve body and actuator assembly immediately following actuation of the actuator assembly and at the commencement of shifting the gate member to the valve closed configuration.

When desired to operate valve 10 by causing gate member 20 to shift to the closed position, as shown in FIG. 7b, solenoid 80 is actuated so as to cause plug 82 to shift and expose passage 86. Pressurized gas supplied by reservoirs 37, 39 and contained within a seat chamber 110 defined by seat 84 and membrane 90 is permitted to escape. Due to the relatively small size of orifice 94, the pressure within seat chamber 110 cannot quickly equalize with the pressure in bore 104. Thus, the force of the pressurized gas within bore 104 causes membrane 90 to flex into seat chamber 110 and thereby become unseated from rib 98. Pressurized gas from within bore 104, opening 74 and upper portion 106 may escape into annular recess 100 and through port 102. A screen 112 and diffuser 114 are installed around seat 84 and coupler 92 to prevent entry of debris into port 102 and passage 86. Further, diffuser 114 operates to muzzle the discharge of pressurized gas to prevent injury or damage to persons or object in close proximity to valve 10 upon actuation thereof.

The evacuation of pressurized gas from the actuator assembly causes a shift in the forces acting upon seal 64. The force of the pressurized gas acting upon the surface of seal 64 in lower portion 108 of enclosed area 66 is now greater than the force of the pressurized gas acting upon the surface of seal 64 which resides in upper portion 106. Accordingly, seal 64 becomes unseated from tubular projection 62 and a pathway fluidly coupling reservoirs 37, 39 and chamber 48 is established. Particularly, the pathway for the flow of pressurized gas from reservoirs 37, 39 to chamber 48 is as follows: reservoirs 37, 39, through passages 54, 56, respectively, through central section 60 and enclosed area lower portion 108, and into chamber 48. Pressurized gas enters chamber 48 and acts upon piston body 44 thereby causing gate member 20 to shift to the closed position.

Figure 12:
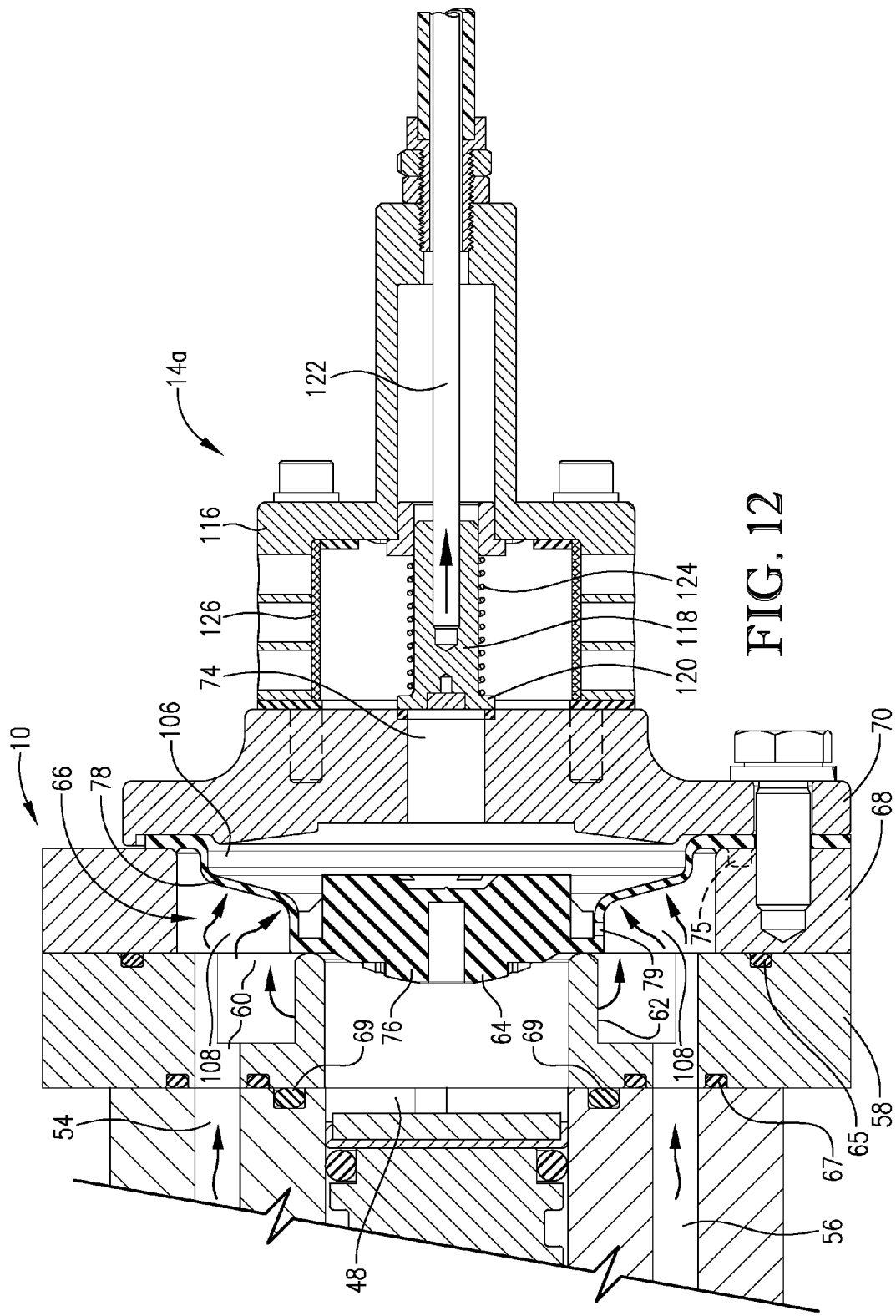
FIG. 12 is a cross-sectional view of an alternate actuator assembly, namely a mechanical actuator assembly, for use with the present invention.

Other types of actuator assemblies can be used to initiate a flow of pressurized gas stored in reservoirs 37, 39 and cause gate member 20 to shift from the valve open position to the valve closed position, and thus the foregoing description should not be seen as limiting the scope of the invention in any way. One alternate actuation scheme is depicted in FIG. 12. In this embodiment, a mechanically triggered actuator assembly 14a is shown secured to valve 10. Actuator assembly 14a is secured to connector plate 70, and all elements thereunder remain as previously described. Actuator assembly 14a comprises an outer housing 116 inside of which an actuator 118 having a radially enlarged head 120 is slidably received. Actuator 118 is coupled with an actuator cable 122 that interconnects actuator assembly 14a with some kind of mechanical device (not shown), the operation of which will initiate closure of valve 10. In certain embodiments, this mechanical device can be a rupturable device such as an explosion vent or rupture disc. However, any device capable of moving cable 122 may be used.

In the non-actuated configuration of actuator assembly 14a, a spring 124 is used to bias actuator 118 toward connector plate 70 so that head 120 is seated thereon and seals opening 74 to prevent escape of pressurized gas from the valve 10. Upon actuation of the mechanical device that is coupled to cable 122, cable 122 and actuator 118 are retracted against the bias of spring 124. This unseals opening 74 permitting pressurized gas located in enclosed area upper portion 106 to escape thereby permitting the pressurized gas located in enclosed area lower portion 108 to effect shifting of seal 64 from its seated position on tubular projection 62. Accordingly, pressurized gas from reservoirs 37, 39 is permitted to enter chamber 48 and effect shifting of gate member 20 to the valve closed configuration. Actuator housing 116 may be ported and lined with a screen 126 similar to those corresponding structures in actuator assembly 14 previously described.

We claim:
1. A valve comprising:
   a valve body having a pair of opposed sidewalls each having an inner surface and an opposed outer surface, there being a chamber between the inner surfaces of said sidewalls;
   a gate member within said chamber and shiftable along a generally rectilinear path of travel between a valve open position and a valve closed position, the entirety of said path of travel lying in a first plane;
   at least one elongated pressurized gas reservoir defined by the outer surface of one of said sidewalls and an adjacent wall surface spaced therefrom, the majority of the length of said reservoir lying in a second plane generally parallel with said first plane,
   said gate member in said valve open position located in side-by-side adjacency to said at least one reservoir; and
   an actuator assembly configured to initiate a flow of said pressurized gas from said at least one reservoir and cause said gate member from said valve open to said valve closed position,
   said at least one reservoir configured to hold a sufficient amount of pressurized gas to effect the shifting of said gate member between said valve open and valve closed positions without said at least one reservoir being connected to and receiving gas from an external source of pressurized gas during shifting of said gate member.

2. The valve according to claim 1, there being a pair of said pressurized gas reservoirs, each gas reservoir defined by the outer surface of a respective one of said sidewalls and an adjacent wall surface spaced therefrom, the majority of the lengths of said reservoirs each lying in a plane generally parallel with said first plane.

3. The valve according to claim 1, wherein said gate member includes a piston body configured to be received in a chamber formed within said valve body.

4. The valve according to claim 3, wherein said actuator assembly is configured, upon actuation thereof, to cause the pressurized gas stored in said at least one reservoir to flow into said chamber.

5. The valve according to claim 4, wherein said valve body at least partially defines a pathway that fluidly connects said at least one reservoir with said chamber.

6. The valve according to claim 5, wherein said actuator assembly includes a seal normally disposed in fluid blocking relationship with said pathway, and upon actuation of said actuator assembly the pressurized gas within the reservoir causing said seal member to shift out of said blocking relationship with said pathway to permit flow of pressurized gas from the reservoir into the chamber.

7. The valve according to claim 6, wherein said seal is normally maintained in fluid blocking relationship with said pathway at least in part by a force exerted on said seal by the pressurized gas stored within said pressurized gas reservoir.

8. The valve according to claim 7, wherein said seal comprises an opening formed therein permitting communication of pressurized gas within said pressurized gas reservoir with a portion of said seal not in direct facing relationship to said pathway.

9. The valve according to claim 8, wherein said actuator assembly upon actuation thereof causes a release of pressurized gas acting upon said portion of said seal not in direct facing relationship to said pathway thereby permitting said seal to shift out of said fluid blocking relationship with said pathway and the pressurized gas to flow from said pressurized gas reservoir into said chamber to effect shifting of said gate member to the valve closed position.

10. The valve according to claim 1, wherein said actuator assembly includes a solenoid.

11. A valve comprising:
a valve body having a pair of opposed sidewalls each having an inner surface and an opposed outer surface, there being a chamber between the inner surfaces of said sidewalls;
a gate member within said chamber and shiftable along a generally rectilinear path of travel between a valve open position and a valve closed position, the entirety of said path of travel lying in a first plane;
at least one elongated pressurized gas reservoir defined by the outer surface of one of said sidewalls and an adjacent wall surface spaced therefrom, the majority of the length of said reservoir lying in a second plane generally parallel with said first plane, there being a pathway fluidically connecting said reservoir and said chamber,
said gate member in said valve open position located in side-by-side adjacency to said at least one reservoir; and
an actuator assembly configured to initiate a flow of said pressurized gas from said at least one reservoir and cause said gate member from said valve open to said valve closed position,
said actuator assembly including a seal normally maintained in blocking relationship to said pathway at least in part by a force exerted on said seal by the pressurized gas within said pressurized gas reservoir,
said seal being shiftable out of said blocking relationship to said pathway upon actuation of said actuator assembly, thereby permitting communication between said pressurized gas reservoir and said chamber.

12. The valve according to claim 11, wherein said seal has an opening formed therein permitting communication of pressurized gas within said pressurized gas reservoir with a portion of said seal not in direct facing relationship to said pathway.

13. The valve according to claim 12, wherein said actuator assembly upon actuation thereof causes a release of pressurized gas acting upon said portion of said seal not in direct facing relationship to said pathway, thereby permitting said seal to shift out of said fluid blocking relationship with said passageway and the pressurized gas to flow from said pressurized gas reservoir into said chamber to effect shifting of said gate member to the valve closed position.

14. The valve according to claim 13, wherein said valve body at least partially defines said pathway that connects said pressurized gas reservoir with said chamber.

* * * * *